United States Patent
Zogg et al.

(10) Patent No.: US 9,341,473 B2
(45) Date of Patent: May 17, 2016

(54) GEODETIC SURVEY SYSTEM HAVING A CAMERA INTEGRATED IN A REMOTE CONTROL UNIT

(75) Inventors: Hans-Martin Zogg, Uttwil (CH); Werner Lienhart, Graz (AT); Daniel Nindl, Innsbruck (AT); Norbert Kotzur, Altstaetten (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 516 days.

(21) Appl. No.: 13/820,117

(22) PCT Filed: Aug. 17, 2011

(86) PCT No.: PCT/EP2011/064172
§ 371 (c)(1),
(2), (4) Date: Feb. 28, 2013

(87) PCT Pub. No.: WO2012/034813
PCT Pub. Date: Mar. 22, 2012

(65) Prior Publication Data
US 2013/0162469 A1    Jun. 27, 2013

(30) Foreign Application Priority Data
Sep. 16, 2010    (EP) .................................... 10177211

(51) Int. Cl.
*G01S 19/43*    (2010.01)
*G01C 15/00*    (2006.01)
(Continued)

(52) U.S. Cl.
CPC ............... *G01C 15/002* (2013.01); *G01S 19/14* (2013.01); *G01S 19/42* (2013.01)

(58) Field of Classification Search
CPC .......... G01S 19/42; G01S 19/51; G01S 19/14
USPC .......................... 342/357.25, 357.34, 357.52
See application file for complete search history.

(56) References Cited

U.S. PATENT DOCUMENTS

| 7,222,021 B2 | 5/2007 | Ootomo et al. |
| 2003/0090415 A1* | 5/2003 | Miyasaka ............. G01C 11/00 342/357.31 |

(Continued)

FOREIGN PATENT DOCUMENTS

| DE | 19710722 | 10/1997 |
| DE | 19926706 | 12/1999 |

(Continued)

OTHER PUBLICATIONS

European Search Report completed Feb. 2, 2011 in priority European Application No. EP 10 17 7211.

*Primary Examiner* — Harry Liu
(74) *Attorney, Agent, or Firm* — Maschoff Brennan

(57) ABSTRACT

A survey system including a target unit that has a survey stick having a high-precision localizable target and a hand-held remote control unit. The remote control unit has an electronic graphical display and can be mounted on a holder on the survey stick such that the remote control unit is in a fixed position relative to the target fitted to the survey stick. The remote control comprises a camera for taking a camera image in a defined shooting direction. In addition, an image processing and evaluation unit with a data link to the position-finding unit and to the camera is provided which, from knowledge of the fixed relative position and of a defined shooting direction and also on the basis of the determined target position, can spatially relate image data from the camera to the targets in the coordinate system.

23 Claims, 12 Drawing Sheets

(51) Int. Cl.
  *G01S 19/14* (2010.01)
  *G01S 19/42* (2010.01)

(56) References Cited

U.S. PATENT DOCUMENTS

| | | | |
|---|---|---|---|
| 2008/0180319 A1 | 7/2008 | Islam et al. | |
| 2010/0245587 A1* | 9/2010 | Otani | G01C 15/002 348/169 |
| 2012/0293678 A1* | 11/2012 | Amor Molares | H04N 5/772 348/222.1 |

FOREIGN PATENT DOCUMENTS

| | | | |
|---|---|---|---|
| DE | 19949580 | | 4/2000 |
| EP | 1293755 | | 3/2003 |
| EP | 1503176 | | 2/2005 |
| EP | 1573271 | | 9/2005 |
| EP | 1686350 | | 8/2006 |
| EP | 1734336 | | 12/2006 |
| EP | 2194399 | | 6/2010 |
| KR | 20060110604 | * | 11/2006 |
| KR | 100728377 B1 | * | 6/2007 |
| WO | WO 2010/080950 | | 1/2010 |

* cited by examiner

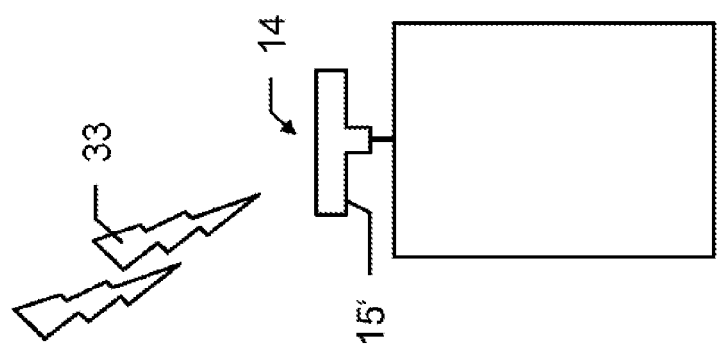
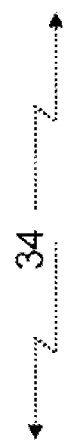
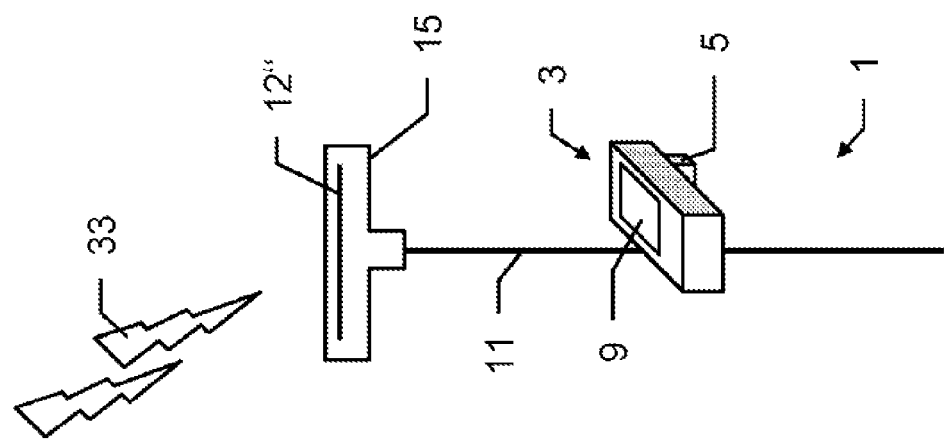
Fig. 5

GEODETIC SURVEY SYSTEM HAVING A CAMERA INTEGRATED IN A REMOTE CONTROL UNIT

FIELD OF THE INVENTION

The invention relates to a survey system having a position determination unit, in particular a total station or a GNSS module, for determining a target position in a defined coordinate system, and having a mobile target unit, equipped with a survey stick, for definition and/or position determination of target points in a defined coordinate system, to a mobile target unit for a survey apparatus, to a remote control unit for a mobile target unit, and to a method for defining and/or determining the position of a target point with a survey system.

BACKGROUND

In order to survey one, or in particular a plurality of target points, numerous geodetic survey apparatuses have been known since antiquity. As standard spatial data, distance and direction, or angle, from a measuring apparatus to the target point to be surveyed are in this case recorded and, in particular, the absolute position of the measuring apparatus is acquired together with possibly existing reference points.

Widely known examples of such geodetic survey apparatuses consist of the theodolite, tachymeter or total station, which is also referred to as an electronic tachymeter or computer tachymeter. A geodetic survey instrument of the prior art is described, for example, in the publication document EP 686 350. Such apparatuses have electrosensor angle and distance measurement functions, which allow determination of direction and distance to a selected target. The angle and distance quantities are in this case determined in the internal reference system of the apparatus and, for an absolute position determination, may possibly also need to be correlated with an external reference system.

In many geodetic applications, points are surveyed by placing specially configured target objects at them. These usually consist of a pole having a targetable marking or a reflector for defining the measurement distance, or the measurement point. Using a central geodetic survey apparatus, even a relatively large number of target objects can therefore be surveyed, although this requires that they be identified. In such survey tasks, in order to control the measurement process and establish or register measurement parameters, various data, instructions, words and other information need to be transmitted between the target object—in particular a handholdable data acquisition apparatus at the target object—and the central measuring apparatus. Examples of such data are the identification of the target object, inclination of the pole, height of the reflector above ground, reflector constants or measurement values such as temperature or air pressure.

Modern total stations have microprocessors for the digital postprocessing and storage of acquired measurement data. The apparatuses are generally produced in a compact and integrated design, usually with coaxial distance and angle measurement elements as well as calculation, control and storage units integrated in an apparatus. Depending on the development level of the total station, means for motorizing the target optics, for reflectorless distance measurement, for automatic target search and tracking and for remote control of the entire apparatus are integrated. Total stations known from the prior art furthermore have a radio data interface for setting up a radio link to external peripheral components, for example to a data acquisition apparatus which, in particular, may be formed as a handholdable data logger, remote control unit, array processor, notebook, small computer or PDA. By means of the data interface, measurement data acquired and stored by the total station can be output to external postprocessing, externally acquired measurement data can be read into the total station for storage and/or postprocessing, remote control signals for remote control of the total station or of another external component, particularly in mobile field use, can be input or output, and control software can be transferred into the total station.

For sighting or targeting the target point to be surveyed, geodetic survey apparatuses according to the generic type comprise, for example, a target telescope, for example an optical telescope, as a sighting device. The target telescope can generally be rotated about a vertical axis and about a horizontal tilt axis relative to a base of the measuring apparatus, so that the telescope can be oriented towards the point to be surveyed by swiveling and tilting. In addition to the optical viewing channel, modern apparatuses may have a camera integrated in the target telescope, and for example oriented coaxially or parallel, for acquiring an image, in which case the acquired image may in particular be represented as a live image on the display of the display/control unit and/or on a display of the peripheral apparatus used for the remote control—for example of the data logger or the remote control unit. The optics of the sighting device may in this case have a manual focus—for example an adjustment screw for changing the position of focusing optics—or an autofocus, the focal position being changed for example by servo motors. Automatic focusing devices for target telescopes of geodetic apparatuses are known, for example, from DE 197 107 22, DE 199 267 06 or DE 199 495 80.

The sighting of a target reflector may in this case be carried out in particular by means of a live image, which is displayed to the user in the display of the data logger or of the remote control unit, which is provided by a camera—for example arranged coaxially in the target telescope or with an orientation parallel to the target telescope—as the sighting device of the total station. Accordingly, the user can orientate the total station with the aid of the live image in accordance with the desired target identifiable in the live image.

EP 1 734 336 discloses a survey system comprising a target unit, which has a reflector and an optical receiver and transmitter. It is in this case proposed to use the optical transmitter of the target unit inter alia to assist the automatic target search process. Thus, after reception of the search or measurement radiation, the target object can communicate its own identification, for example the reflector number or the reflector type, back to the survey station with the aid of the transmitter of the target unit. The survey station can therefore identify the target object found and be configured optimally with respect to the target object.

EP 1 573 271 discloses a target unit also having an optical transmitter, wherein—after reception of measurement radiation of a survey apparatus—the target unit sends back an optical signal on which the target unit's own identity is modulated.

A feature common to the aforementioned survey systems from the prior art is that, optionally with the use of a camera, the target unit or a survey stick provided with the target unit is sighted or observed by a stationary position determination unit, for example a total station. However, no automated guidance of an operator by using the image data recorded by the stationary position determination unit for an intended target point for the purpose of defining the latter is disclosed, so that the definition process is relatively laborious for an operator and entails considerable time expenditure when accurate definition of the target point is intended to be ensured.

For a solution to this problem, U.S. Pat. No. 7,222,021 and the corresponding EP 1 293 755 propose a survey system, referred to in this patent as an operator guiding system, having a stationary base station corresponding to a stationary position determination unit, which is equipped with imaging means, for example a camera, and a mobile station with the function of a mobile target unit, which is equipped with display means, for example a display for representing a current position of the user on the basis of stored landscape images or data, and current images, as seen from the stationary measurement unit. They also disclose the way in which an operator can be guided to the target point by means of correlation between the position data currently measured from the stationary measurement station, including a camera image, for the mobile station, and stored data comprising the intended position of the target point, by marking on the display of the target unit, for example by a direction display by means of an arrow on the display.

Although the process of defining a target point can be accelerated with this system described in U.S. Pat. No. 7,222,021 and the corresponding EP 1 293 755, the disclosure does not reveal any possibilities of improving the accuracy of the definition of the target point; this is because the mobile station does not have its own image acquisition means, and real images are acquired only by the distant stationary total station, while merely synthetic calculated representations from a bird's-eye perspective are used on a mobile display for guiding the mobile station, for example a pole with a reflector.

WO 2010/080950 essentially discloses a pole having a camera fitted (according to the figures) on the upper end in order to determine an azimuth for a target point. It is to be noted that this positioning of the camera can restrict the operability of the apparatus by a user shadowing the image. Connection to a theodolite or a total station is mentioned, but without disclosure regarding coordination/correlation of image data. This document contains no mention of the use of an effect of the fitted camera, or the data thereof, on possible precise positioning of the pole on a target point.

SUMMARY

It is an object of the present invention to provide a survey system and associated units for the survey system, as well as a corresponding surveying method, with which the process of definition and/or position determination of target points can be further accelerated, and further simplified for the operator, and in particular the precision or accuracy of the process can be improved. It is a further object of the invention to provide a possibility of storing, and thus documenting, the actual position of a defined target point in correlation with stored and current data of a stationary position determination unit at the time of definition.

The invention relates to a survey system having a position determination unit, in particular a total station or a GNSS module, for determining a target position in a defined coordinate system, as well as a mobile target unit for definition and/or position determination of target points in the coordinate system. The target unit comprises a survey stick, the lower end of which can be brought into target point contact. A target, the target position of which can be determined with high precision, can be fitted on the survey stick. The target may, in particular, be formed as a survey reflector which can be surveyed with the aid of a total station, for example as a reflective prism, or as a GNSS antenna having a data link to the GNSS module of the position determination unit.

The position determination unit determines, for example, the angles in the horizontal and vertical direction as well as the distance to the target, for example a prism. For a survey system according to the invention with an embodiment of the position determination unit having a GNSS module, the mobile target unit is for example equipped with a GNSS antenna on the survey stick so that the current position of the target can be determined from GNSS measurements.

As the position determination unit for a survey system according to the invention, in principle all embodiments, in particular total stations such as theodolites or GNSS modules (GNSS=Global Navigation Satellite System, for example the Global Positioning System known to the person skilled in the art and abbreviated to GPS) may be envisioned, as are known from the prior art for geodetic survey systems, when they fulfill the requirements according to the present invention, in particular for data-based communication with a mobile target unit. For this reason, particular suitable embodiments of the position determination unit will be discussed in more detail below.

The mobile target unit furthermore comprises a handholdable remote control unit for the survey system. The remote control unit comprises an electronic graphical display and can be attached to a holder on the survey stick in such a way that—in the attached state—the remote control unit is in a fixed position relationship with respect to the target fitted on the survey stick.

According to the invention, the remote control unit comprises a camera for recording a camera image in a defined imaging direction. According to the invention, an image processing and evaluation unit having a data link to the position determination unit and the camera is furthermore provided, by which—with the aid of knowledge of the fixed position relationship and the defined imaging direction, and as a function of the target position determined—image data of the camera are brought into spatial relation with the target points in the coordinate system.

The fixed position relationship of the remote control unit, both with respect to the target fitted on the survey stick and with respect to the lower end of the survey stick, must be known or surveyed at least once and stored in the system data, or it may be measured and logged in real time at the time of surveying or definition for a target point for the associated process, by an apparatus connected to the mobile target unit or the attached remote control unit with the associated camera.

As suitable measurement units for such position determinations from the mobile target unit, or the remote control unit, for example known systems based on laser, ultrasound, radar or radiowave measurement in the known frequency ranges are suitable, which may be connected to the mobile target unit or integrated therein, or in the remote control unit.

For position determination of the remote control unit, which is associated with the mobile target unit, with respect to the stationary position determination unit, stereophotometry may also be employed by using a further camera, fitted either on the stationary position determination unit for the purpose of observation therefrom or on the mobile target unit.

In order to determine an inclination of the remote control unit, or of the associated camera, with respect to the survey stick, an inclination sensor or predetermined angle (for example 45° or 90°) may optionally be provided for mounting in the orientation of the remote control unit, or of the associated camera, with respect to the axis of the survey stick. The (azimuthal) orientation of the remote control unit, or of the associated camera, may for example be determined by a compass, in particular an electronic compass, which is for example integrated in the remote control unit, the survey stick or the target. As an alternative, the survey stick with the remote control unit fitted thereon and the camera may be oriented in a known direction, for example toward the position determination unit, the sun or known positions sighted by the position determination unit.

In other words, with respect to the spatial orientation of the mobile target unit (that is to say the pole with the target fitted at the top and the remote control unit attached in a fixed way—i.e. in a known position) in the defined coordinate system, this may either be based on fixed assumptions which are made, for example that the survey stick is always kept vertical at the measurement position and the remote control unit is always oriented azimuthally in the direction of the total station, in the north direction or in the direction of the sun, or sensors especially suitable therefor may be provided (for example a biaxial inclination sensor for determining the current inclination of the survey stick and a compass for the azimuthal orientation of the target unit).

It is preferred that the camera, the display, the position determination unit and the image processing and evaluation unit are formed and interact in such a way that, as a function of the currently determined target position, one or more target points to be defined or surveyed, which lie in the field of view of the camera and the spatial coordinates of which are known, can be displayed together with the camera image in the display. Advantageously, markings for the target points are in this case displayed in accordance with the target point position, overlaid with the camera image on the display.

It is advantageous in particular that a film sequence acquired by the camera is displayed live on the display and—overlaid on the displayed film sequence—as a function of the currently determined target position, one or more target points to be defined or surveyed, the spatial coordinates of which are known, are marked in the camera image and displayed on the display.

Advantageously, the camera and the display are arranged and oriented on the remote control unit in such a way that the surface normal of the display is oriented essentially parallel to the imaging direction of the camera. Preferably, the optical axes of the display and of the camera are in this case oriented essentially coaxially—but the viewing directions mutually opposite. In other words, this means that an operator is offered the possibility of a direct view of the position of a target point to be defined in the display according to the displayed stored data and the associated marking.—Such a "viewing mode" allows a very accurate match of the marking actually carried out for a target point with its intended placement, and at the same time storage and exact documentation of the target placement at the current time in correlation with the simultaneously recorded data of the (stationary) position determination unit.—Such a possible use is neither disclosed nor anticipated in the known prior art.

Preferably, the camera is oriented in such a way that—when the remote control unit is attached to the survey stick—the lower end of the survey stick lies in the field of view of the camera.

It is likewise preferred that, when the remote control unit is attached to the survey stick—owing to the structure of the survey stick—the fixed position relationship of the remote control unit relative to the fitted target is ensured. The fixed position relationship of the image processing and evaluation unit of the remote control unit with respect to the target may, in particular, be made available with the aid of one of the following means:

storage means, in which the fixed position relationship is stored, position relationship determination means, which make a current distance from the remote control unit to the target and/or a current orientation, in particular the azimuthal and/or elevational orientation, of the remote control unit determinable, in particular with the position relationship determination means comprising a distance sensor and/or a compass integrated in the remote control unit and/or an inclination sensor integrated in the remote control unit, input means, so that data relating to the fixed position relationship can be entered by the user, a data set stored electronically or graphically on the survey stick, in particular the holder, which comprises information relating to the fixed position relationship ensured by the survey stick, and readout means provided in the remote control unit so that the data set can be read out at the remote control unit.

The invention furthermore relates to a mobile target unit for a survey system according to the invention, which comprises a survey stick, the lower end of which can be brought into target point contact. A target, the target position of which can be determined with high precision, can be fitted on the survey stick. The target may, in particular, be formed as a survey reflector which can be surveyed with the aid of a total station, or as a GNSS antenna having a data link to the GNSS module of the position determination unit. The mobile target unit furthermore comprises a handholdable remote control unit for the survey system. The remote control unit comprises an electronic graphical display and can be attached to a holder on the survey stick in such a way that—in the attached state—the remote control unit is in a fixed position relationship with respect to the target fitted on the survey stick.

According to the invention, the remote control unit comprises a camera for recording a camera image in a defined imaging direction. According to the invention, an image processing and evaluation unit having a data link to the position determination unit and the camera is furthermore provided, by which—with the aid of knowledge of the fixed position relationship and the defined imaging direction, and as a function of the target position determined—image data of the camera are brought into spatial relation with the target points in the coordinate system.

Advantageously, the camera and the display are arranged and oriented on the remote control unit in such a way as to allow an operator a possibility of viewing a terrain surface by means of the camera, with the surface normal of the display being oriented essentially parallel to the imaging direction of the camera, in particular with the optical axes of the display and of the camera being oriented essentially coaxially—but the viewing directions mutually opposite.

Other embodiments of a mobile target unit according to the invention for a survey system according to the invention are described in the dependent claims.

The invention furthermore relates to a remote control unit for a mobile target unit according to the invention. The remote control unit comprises an electronic graphical display and can be attached to a holder on the survey stick in such a way that—in the attached state—the remote control unit is in a fixed position relationship with respect to the target fitted on the survey stick. According to the invention, the remote control unit comprises a camera for recording a camera image in a defined imaging direction. In this case, an image processing and evaluation unit having a data link to the position determination unit and the camera is provided, by which—with the aid of knowledge of the fixed position relationship and the defined imaging direction, and as a function of the target position determined—image data of the camera are brought into spatial relation with the target points in the coordinate system.

Other embodiments of a remote control unit according to the invention are described in the dependent claims.

The invention furthermore relates to a method for defining and/or determining a position of a target point with a survey system according to the invention. The method comprises the following steps:

- attaching a handholdable remote control unit, having a camera fitted thereon, to a survey stick, the lower end of which can be brought into target point contact, with the remote control unit being attached in a fixed position relationship with respect to a target fitted on the survey stick,
- establishing or ensuring a data interchange link between the mobile target unit, in particular the remote control unit, and the position determination unit,
- arranging the camera in the direction of a terrain surface, in which target points are to be defined or surveyed, and recording images and displaying them on a display of the remote control unit continuously or at defined time intervals,
- inserting a direction indicator, in particular by means of an arrow, and/or indicators of distance to an intended target point and/or a marking for the intended position of the intended target point, into the image of the cameras in the display,
- guiding the target unit until a match of the image of the lower end of the survey stick with the marking for the intended position of the target point is achieved,
- defining or determining the position of the target point.

Optionally, recording in real time and storage of an image of the defined or position-determined target point may additionally be carried out by means of the camera.

Overall, the present invention very greatly simplifies or facilitates the process of definition and/or position determination of target points for an operator, which is associated with a significant achievable process acceleration. At the same time, the invention allows significant improvement of the accuracy in the definition and position determination of target points. The camera fitted on the handholdable remote control unit, as a main feature of the present invention for improving survey systems according to the generic type, facilitates and improves the conduct of the aforementioned processes by a current live image of the lower end of the survey stick being overlaid in an image of the remote control unit camera with a marking of the intended or stored position of a target point. The video stream of this camera shows a current view of the surface of the terrain to be surveyed.

This is substantially different from the representation possibilities of known systems according to the generic type, in which surface views are typically simulated for a user from current measurement data of a stationary position determination unit, in conjunction with a mobile target unit, and stored data, without—apart from the distance and direction between the stationary position determination unit and the mobile target unit—further data relating to the mobile target unit being taken into account.

As described above, the camera fitted on the handholdable remote control unit allows a ground "viewing mode" without—in the case of a corresponding orientation of the camera—the user himself being compelled to look constantly at the ground (in particular directly below or in front of him), which makes it easier for the operator to move forward in terrain which is particularly difficult to navigate.

A corresponding configuration of the handholdable remote control unit, or of the camera fitted thereon, for example with sensors for determining the orientation of the camera, according to the invention also makes it possible for the operator to record overview photographs of a terrain to be surveyed, from the position of the mobile target unit, the information of which can be converted by correlation with the stationary position determination unit into the coordinate system thereof.

In particularly steep terrain, problems may sometimes arise in that the position of a target point to be defined can no longer be projected accurately into the current image of the camera of the remote control unit. For this, corrections of the position mark inserted for the target point to be defined may be provided, by using and jointly taking into account a DTM ("digital terrain model") of the terrain for the corresponding insertion of the position mark. If a DTM of the terrain is not available, then an RIM (Range Imaging Sensor) camera may also be integrated in the remote control unit, with the aid of which a terrain model can be acquired before or even during the definition and the measurement process, and therefore taken into account (or alternatively with the aid of stereophotogrammetry).

BRIEF DESCRIPTION OF THE DRAWINGS

The method according to the invention and the apparatuses according to the invention will be described in more detail below purely by way of example with the aid of specific exemplary embodiments schematically represented in the drawings, further advantages of the invention also being discussed. In detail:

FIG. 5 shows another possible embodiment of a survey system according to the invention;

DETAILED DESCRIPTION

The following description of the figures is directed at the use of the invention for the definition of target points. Position determination of target points in the sense of the present inventions is carried out in an entirely similar way to this. All embodiments of the invention described above and below may be combined with one another in any desired way, as well as with the aforementioned prior art, unless explicitly stated otherwise.

Figure 1:
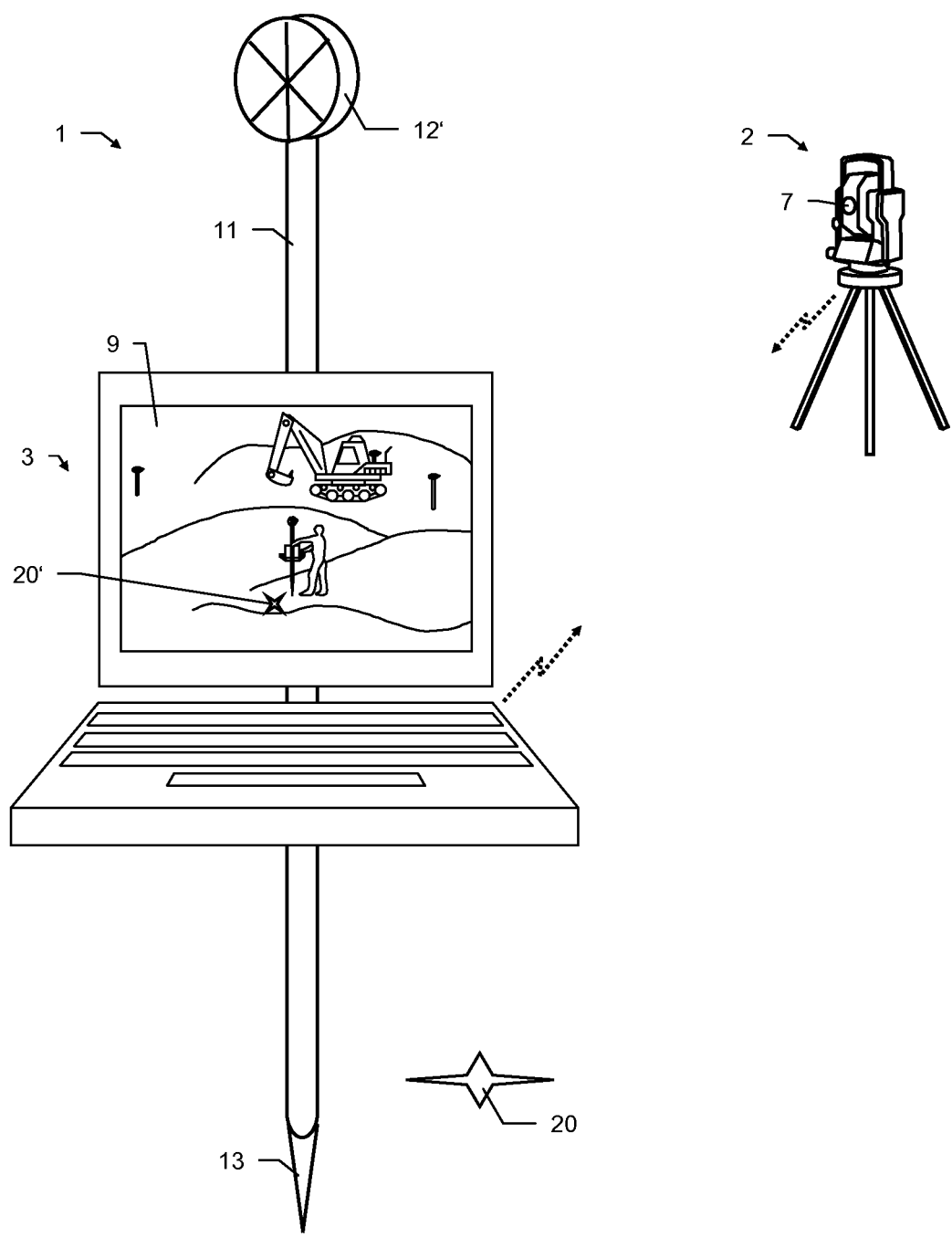
FIG. 1 shows a survey system according to the prior art.

FIG. 1 shows a survey system according to the prior art. The survey system comprises a position determination unit 2 formed as a total station, and a mobile target unit 1 having a survey stick 11 which has a lower end 13. A target, which in this example is formed as a survey reflector 12' that can be surveyed by the total station 2, is fitted on the survey stick 11. A handholdable remote control unit 3, which is preferably formed as a data logger, having a display 9 is attached to a holder (not shown) of the survey stick. A focused live image of a camera as a sighting device 7 of the total station 2 can be displayed on the display 9. The camera may be integrated in a target telescope as a sighting device 7 of the total station 2, with corresponding optics. Besides the current view of an operator of the mobile target unit 1, the intended position of a target point 20 in the landscape is represented in the live image of the camera as a marking 20'. The operator changes his position in the landscape until he establishes a match of his current position with the marking 20' in the camera image, and then defines the target point 20.—The survey system according to the invention may also be operated according to this functionality, which comes from the prior art, by selecting a corresponding screen display option.

Figure 2:
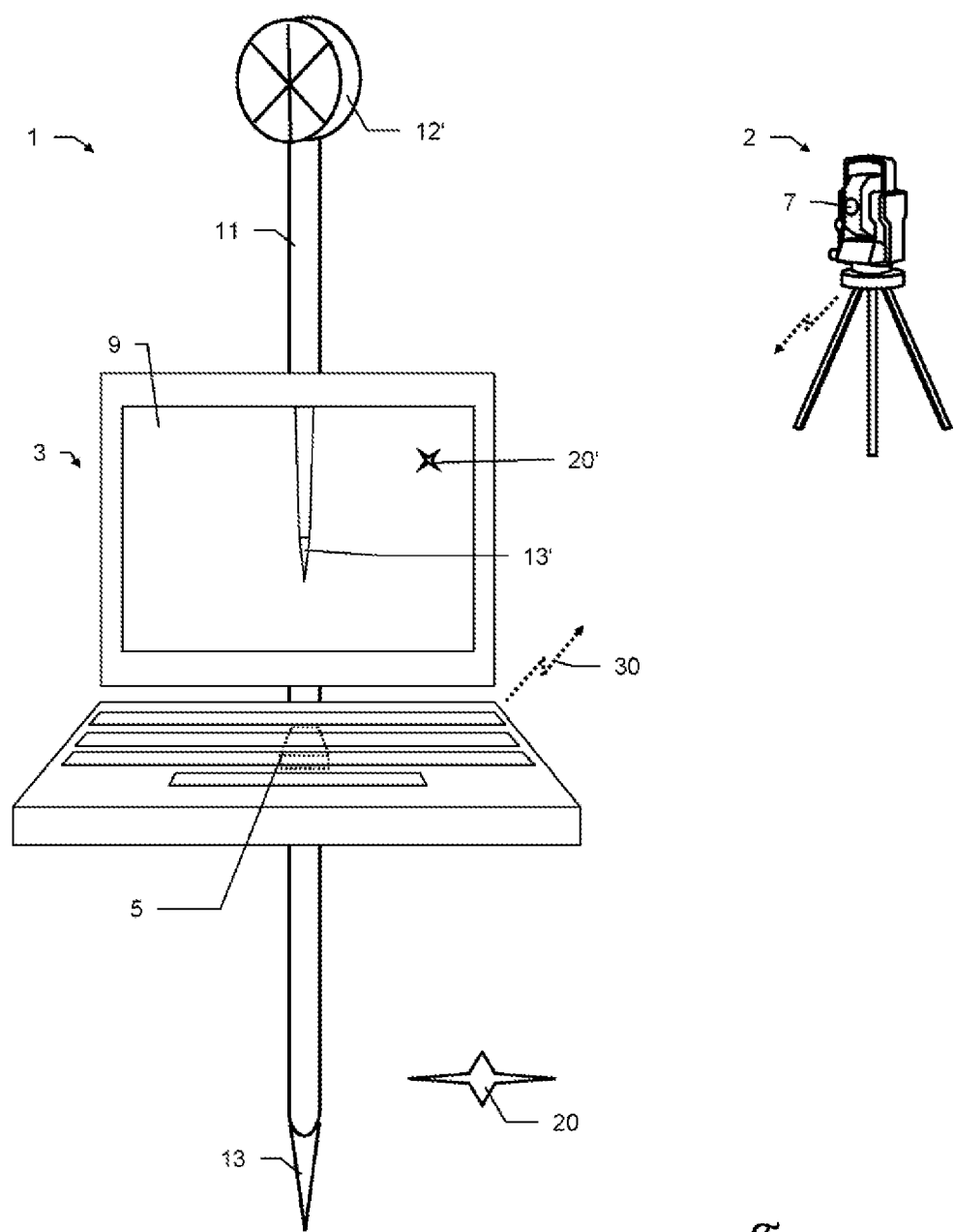
FIG. 2 shows a survey system according to the present invention.

FIG. 2 shows a survey system according to the present invention. In contrast to the survey system according to FIG. 1, the handholdable remote control unit 3, in this operating mode attached to the survey stick 11, is equipped on its lower side with a camera 5 in a defined holding direction, i.e. in this example the direction of the ground. The remote control unit 3 is in a fixed position relationship with respect to the survey reflector 12' attached to the survey stick 11 and functioning as a target. The live stream of the camera 5 is represented on the display 9 of the remote control unit 3. In the upper middle of the image, the image 13' of the lower end 13 of the survey stick 11 can be seen in a manner corresponding to the field of view of the camera 5. Inserted into the camera image, there is a marking 20' which displays the intended position of the target point 20 to be defined. This corresponds to an exemplary situation in which the intended position of the target point 20, corresponding to the marking 20', lies in the field of view of the camera 5. Finding and definition of the target point 20 is thereby substantially facilitated, and the definition process is accelerated compared with the possibilities which are provided by the prior art. Furthermore, the accuracy of the target point definition can be increased significantly and finally also documented exactly in a true fashion since the monitoring of the match between the intended position of the target point 20 and its actual definition is carried out not by a far distant camera, but directly in situ by the camera also carried by the mobile target unit 1, in the field of view of which the lower end 13 of the survey stick, in this example formed as a tip, is located.

The arrow 30 symbolizes a data link of the camera 5 to an image processing and evaluation unit (not shown), as there is also from there to the position determination unit 2. With the aid of knowledge of the defined imaging direction of the camera 5 and of the fixed position relationship between the remote control unit 3, comprising the camera 5, and the survey reflector 12' attached to the survey stick 11, and as a function of the determined current target position 20' of the survey reflector 12', the image data of the camera in a defined coordinate system of the position determination unit 2 are brought into spatial relation with the one or more target points 20.

Figure 3:
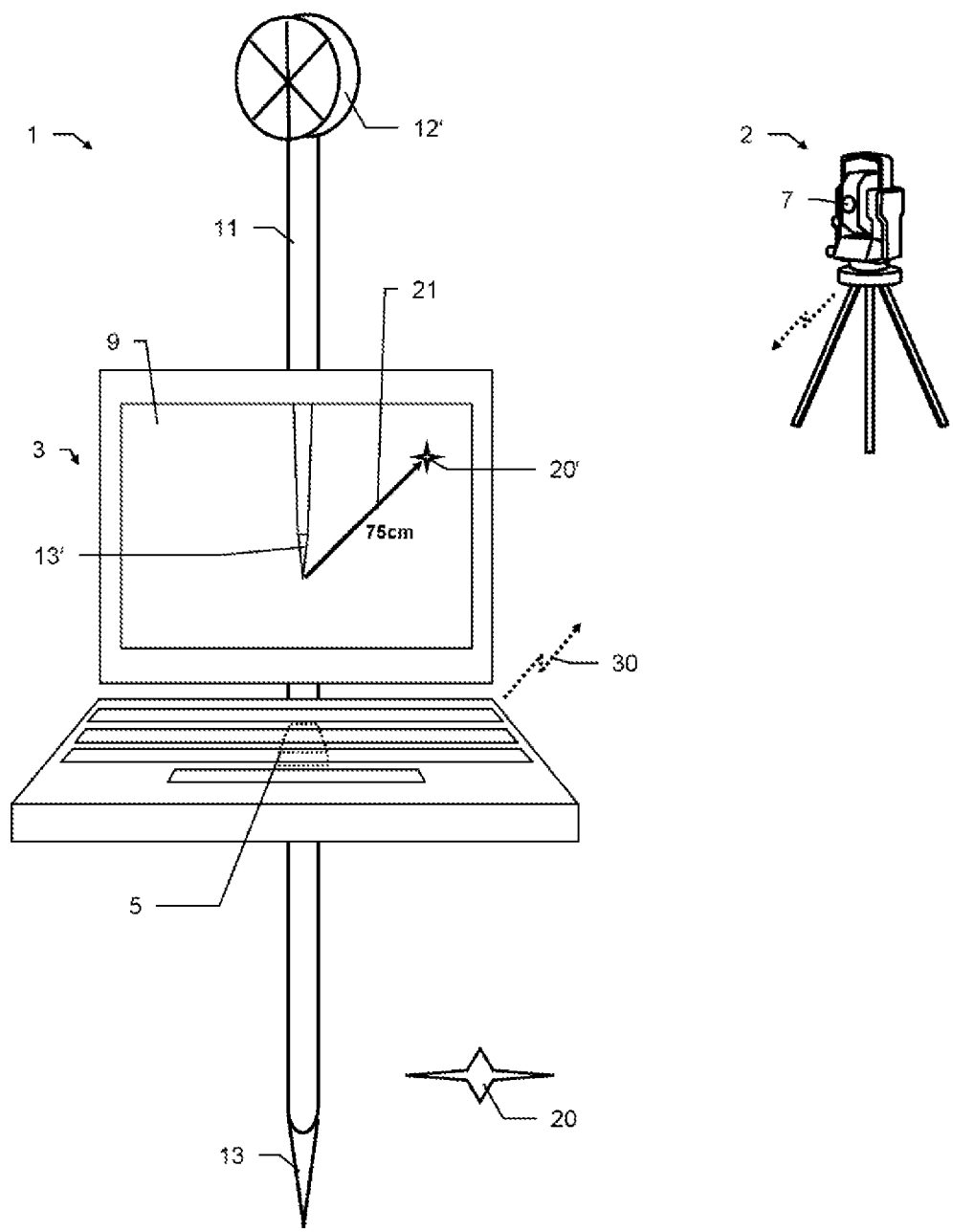
FIG. 3 shows a survey system according to FIG. 2, additionally with a direction indicator from a lower end, imaged in a display, of a survey stick to a marking for an intended target point.

FIG. 3 corresponds essentially to the arrangement represented in FIG. 2. Additionally, an arrow 21 is represented on the display 9, by which the direction and distance to the intended position of the target point 20 according to the marking 20' is indicated to an operator. So long as the intended position of a target point 20 lies outside the field of view of the camera 5, for example, only a direction arrow is displayed, preferably also with a distance indication, but without an inserted marking 20'.

Figure 4:
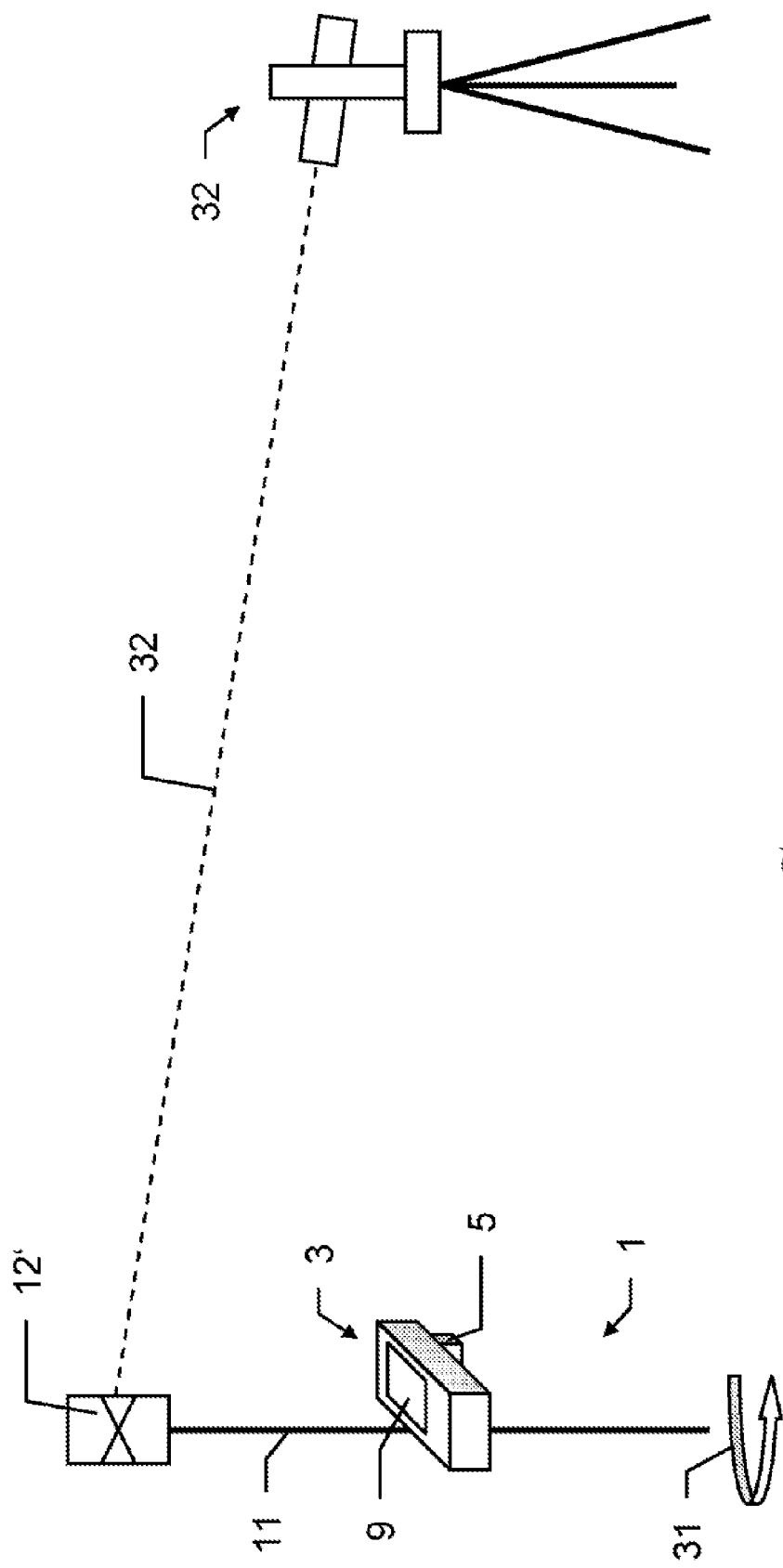
FIG. 4 shows another possible embodiment of a survey system according to the invention.

FIG. 4 illustrates a possible embodiment of a survey system according to the invention, in which the position determination unit 2 is formed as a total station and the mobile target unit 1 comprises a prism 12' as the target on the survey stick 11.

The—in particular azimuthal—orientation of the remote control unit, or of the associated camera, indicated by the arrow 31, may for example be determined with a compass, in particular an electronic compass, which is for example integrated in the remote control unit, the survey stick or the target.

As an alternative, the (in particular azimuthal) orientation of the remote control unit, or of the associated camera, may also be determined with the aid of inertial sensors, in particular rotation rate sensors (gyroscopes) and/or acceleration sensors. In particular, the sensors may in this case also be integrated in a compact inertial measurement unit "IMU".

In another embodiment, however, the azimuthal orientation may also be determined without additional sensors. For example, the azimuthal orientation may be determined with the aid of a combination of the data relating to the distance travelled with the target unit (movement history of the target) with camera data (i.e. data relating to how (the direction in which) the recorded surface moves during the progress of the target unit through the camera image). This method of determining the azimuthal orientation of the remote control unit will also be discussed in more detail again in connection with FIG. 9.

The broken line 32 indicates the determination of direction and distance between the total station 2 and the prism 12' as the target of the mobile target unit 1, which may be carried out with the known techniques of geodetic survey systems.

FIG. 5 illustrates another possible embodiment of a survey system according to the invention, in which the target unit 1 comprises the position determination unit, the position determination unit being formed as a GNSS module 15, in which a GNSS antenna 12" is integrated as the target, and being fitted on the survey stick 11. A fixed position relationship between the remote control unit 3 and the GNSS antenna 12" as the target of the mobile target unit 1 is ensured by known dimensions and structure of the survey stick 11, as well as of the design of the holder (not shown) for the remote control unit, for example a predetermined inclination, for example 10°, of the remote control unit relative to the horizontal. In order to increase the accuracy of the target position of the GNSS antenna 12", determined by the GNSS module 15 of the target unit, the GNSS module may—as is known to the person skilled in the art of geodesy—be in data contact with a reference station 14. For example, the reference station 14 may in this case be a total station with its own attached GNSS module 15', the position of which is known with high precision in the field or determined in another way, so that the total station functioning as a reference station 14 can therefore derive and provide GNSS correction data. The arrows 33 in this case indicate GNSS satellite signals 33 received by the GNSS module 15 of the target unit 1 and by the GNSS module 15' of the reference station 14 for position determination, and the arrows 34 indicate radio signals 34 exchanged for GNSS correction data communication and optionally for additional data communication.

Figure 6:
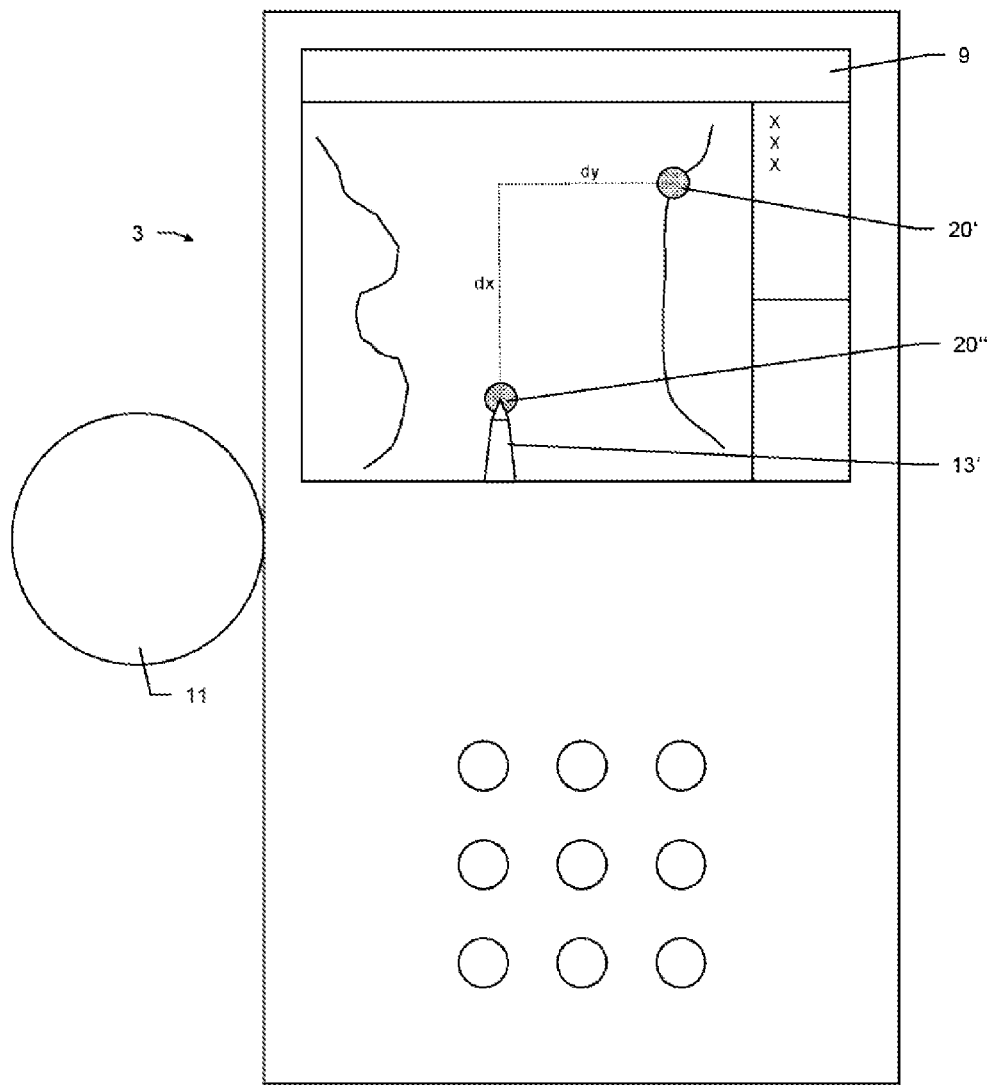
FIG. 6 shows the functionality of a survey system according to the invention in field use with the aid of the image in the display of a remote control unit according to the invention.

FIG. 6 illustrates the functionality of a survey system according to the invention in field use with the aid of the image in the display 9 of a remote control unit 3 according to the invention. The live stream of the images of the camera 5 is represented in the display 9. The handholdable remote control unit 3 is attached to the survey stick 11. In the live stream on the display 9, the imaging 13' of the lower end 13 of the survey stick 11 by the camera 5 can be seen, with designation 20" of its current position. The marking 20' for the intended position for definition of the target point is furthermore inserted into the image of the camera 5. "dx" and "dy" symbolize the distances between the positions 20' and 20" in this representation in the coordinate system of the position determination unit 2 or 2'. In another operating mode of the system according to the invention, an arrow with indication of the direction and the direct distance between the positions corresponding to the markings 20" and 20' could naturally also be displayed instead of this.

Furthermore, a plurality of live streams of different cameras could be provided in the display 9, for example both of the camera 5 of the mobile target unit 1 and of a camera (for example used in the function of an overview camera) as a sighting device 7 of the stationary position determination unit 2.

Figure 7:
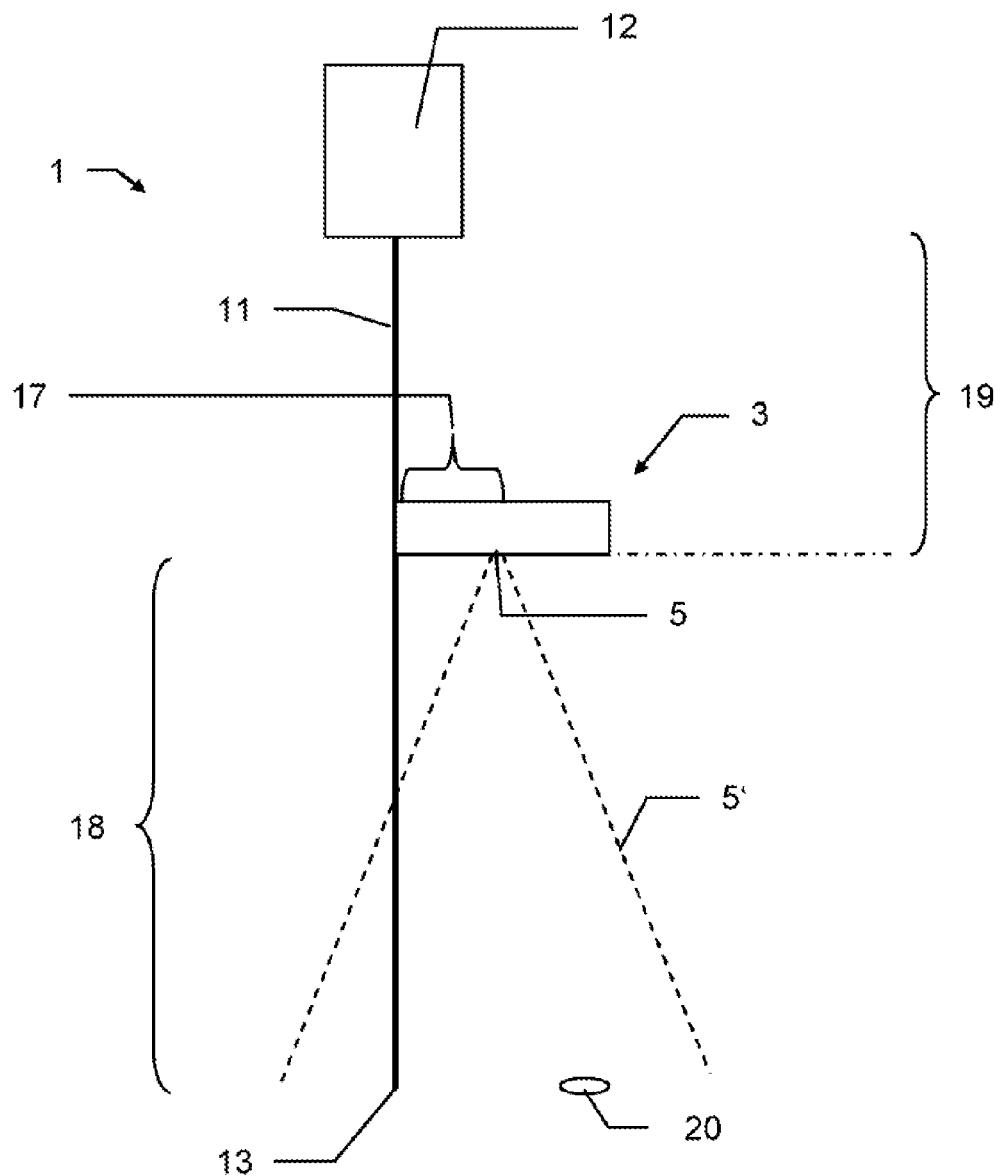
FIG. 7 shows a possible embodiment of a target unit according to the invention.

FIG. 7 shows an embodiment of a target unit 1 according to the invention for a survey system. In a similar way as shown in FIGS. 4 and 5, the mobile target unit 1 of FIG. 7 likewise comprises a survey stick 11, on the upper end of which a target 12 (for example a reflector or a GNSS antenna integrated in a GNSS module) is arranged. The target 12 and the survey stick 11 may, for example, in this case be configured so that they can be connected to one another by a screw connection, so that the target 12 can be fitted on the stick 11—by screwing—and removed from the stick—by unscrewing.

As part of the target unit 1, there is furthermore a remote control unit 3 having an electronic graphical display, which can be fastened on a mount—specially provided on the survey stick 11 for the purpose of positionally stable and fixed attachment of the remote control unit 3.

A corresponding configuration of the mount in this case ensures that the remote control unit 3 is attached to the survey stick 11 with a known elevational inclination relative to the horizontal (for example with a fixed elevational inclination of between 0 and 15°), so that when the survey stick 11 is kept vertical the inclination of the remote control unit 3 is also known or, for example, can respectively be determined currently with the aid of an integrated inclinometer.

Furthermore, according to the invention the remote control unit 3 once more comprises a camera 5, for example with the viewing direction and the field of view 5' of the camera 5 being predetermined by calibration and therefore known. The camera is in this case arranged for example on the lower side of the remote control unit (that is to say the opposite side of the remote control unit from the display side) in such a way that—when the remote control unit 3 is fastened on the survey stick 11—the lower end 13 (i.e. the contacting tip) of the survey stick 11 lies in the field of view 5'.

The fixed known position (i.e. position relationship) between the remote control unit 3 and the target 12 of the mobile target unit 1 is ensured by known dimensions and structure of the survey stick 11, as well as of the design of the holder (not shown) for the remote control unit 3. For example, the vertical distance 19 from the target 12 to the camera 5 of the remote control unit 3 is known, as well as the horizontal distance of the camera 5 from the survey stick 11 (which, with central fastening of the target 12 on the stick 11, also corresponds to the horizontal distance of the camera 5 from the target 12). As an alternative—with a known survey stick length (i.e. target height)—the height 18 of the camera 5, or of the remote control unit 3, above the lower end 13 of the survey stick 11 may also be known or currently determined with the aid of an electronic distance meter (for example laser distance meter for measuring the distance of the remote control unit 3 from the ground) integrated in the remote control unit 3, and this height 18 may then be subtracted from the survey stick length in order to be able to deduce the vertical separation of the remote control unit 5 from the target 12 (and therefore the position relationship of the camera 5 with respect to the target 12).

According to the invention, in this case an image processing and evaluation unit having a data link to a position determination unit (which determines the position of the target) and the camera 5 is once more provided by which—with the aid of knowledge of the fixed position relationship and of the defined imaging direction, and as a function of the determined target position—image data of the camera 5 are brought into spatial relation with the target point 20 to be defined.

In particular, the camera 5, the display, the position determination unit and the image processing and evaluation unit are in this case formed and interact in such a way that, as a function of the currently determined target position, the target point 20 to be defined, which lies in the field of view 5' of the camera 5 and the spatial coordinates of which are known, can be displayed together with the camera image in the display, in particular with a marking for the target point 20 being displayed on the display in accordance with the position of the latter in the image, overlaid on the camera image.

Figure 8:
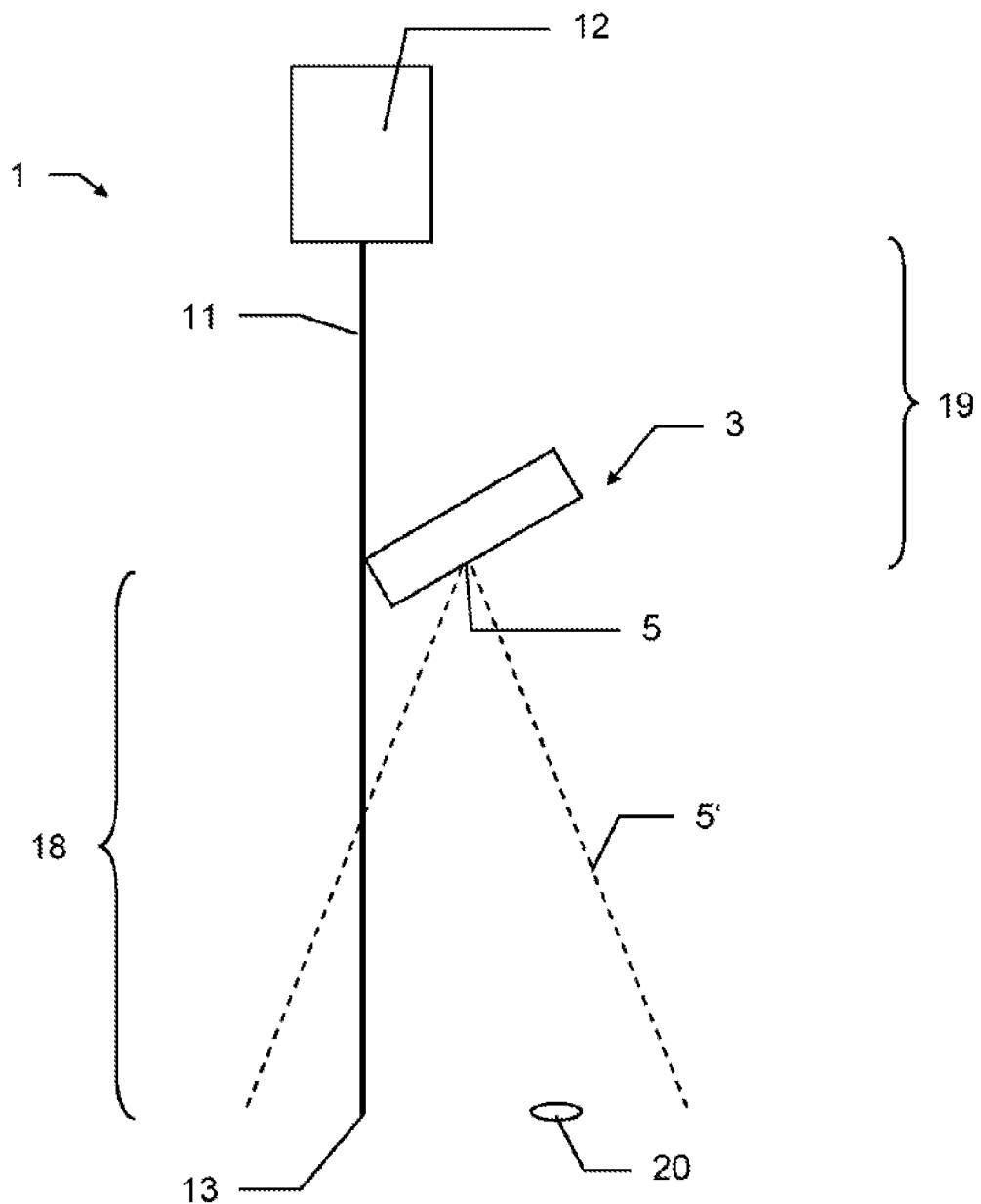
FIG. 8 shows another possible embodiment of a target unit according to the invention.

FIG. 8 shows an embodiment of a target unit 1 according to the invention which is similar to FIG. 7. As previously in FIG. 7, the camera 5 and the display are in this case arranged and oriented on the remote control unit 3 in such a way as to allow an operator a possibility of viewing a terrain surface by means of the camera 5. The only difference, however, is now that the camera is arranged on the lower side of the remote control unit 3 in such a way that the surface normal of the display is oriented such that it is inclined at an angle of between 0 and 50°, in particular between 10 and 45°, especially about 30°, with respect to the imaging direction of the camera 5. This alternative embodiment allows slightly inclined—relative to the horizontal—fitting of the remote control unit on the pole, so that, ergonomically advantageously for the user, the display is easy to read and the remote control unit is easy and convenient to operate.

In addition, the camera may also be formed in such a way that it can be oriented variably, so that, depending on the selected inclination angle with which the remote control unit is fitted on the pole, the imaging direction of the camera can also be inclined in a defined way so that, for example, the imaging direction points vertically downward, or at least so as to ensure that the lower tip of the survey stick once more lies in the field of view of the camera.

Figure 9:
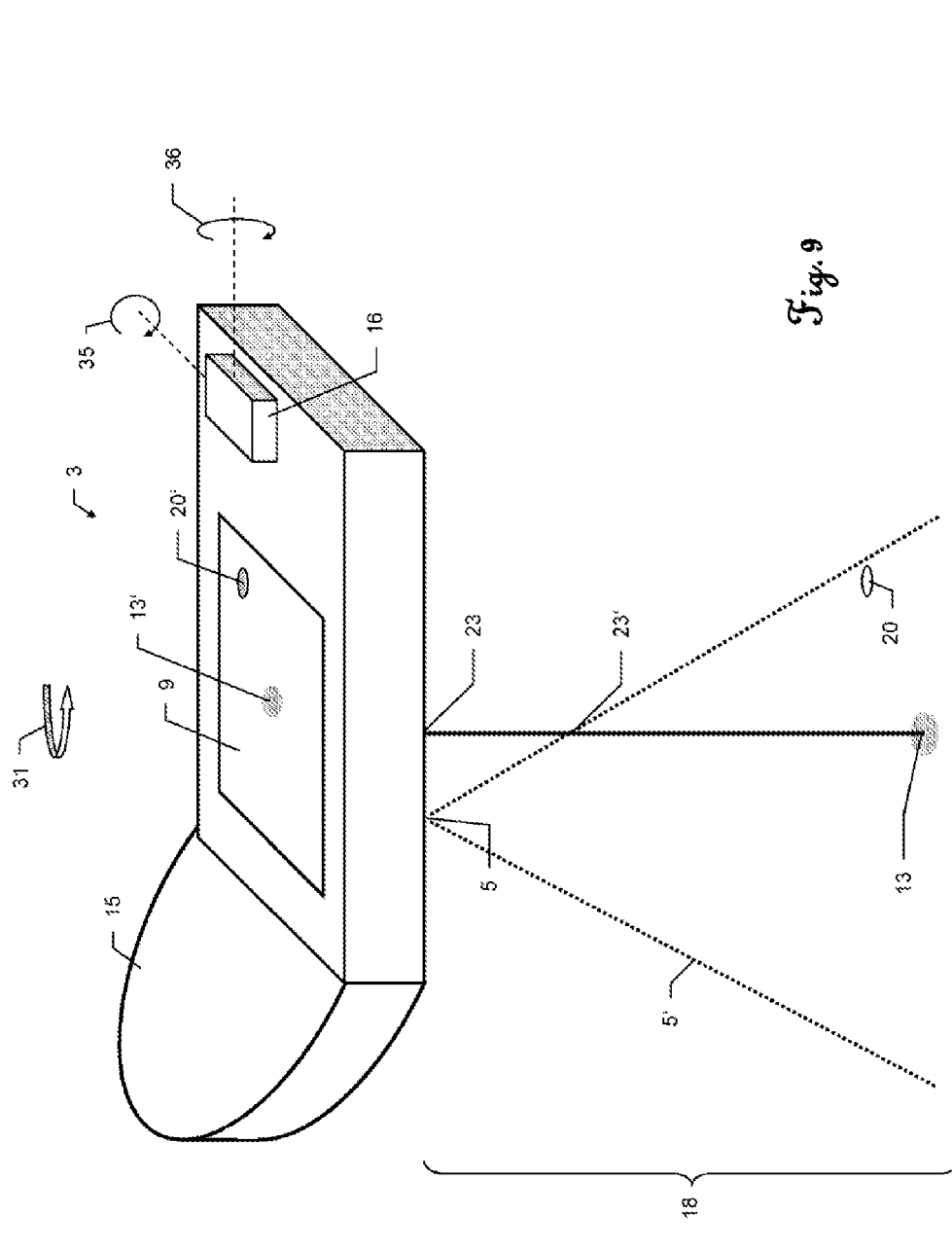
FIG. 9 shows a mobile target unit having a GNSS module, all the components of the mobile target unit being integrated in a handholdable apparatus.

FIG. 9 shows an embodiment of a survey system according to the invention, having a mobile target unit without necessarily requiring a survey stick. The survey system in this case comprises a—integrated in a compact handholdable apparatus 3—mobile target unit for definition and/or position determination of target points 20 in a defined coordinate system. According to this embodiment, the following components are now integrated in the target unit:

a GNSS module 15 formed as a position determination unit, having an integrated GNSS antenna 12" formed as a target, for determining the target position in the coordinate system, an electronic graphical display 9, a camera 5 for recording a camera image in a defined imaging direction—directed approximately vertically downward in the working position of the handholdable apparatus, a sensor 16, in particular a biaxial inclinometer, for determining a pitch angle and a roll angle 35, 36 of the apparatus, an orientation determination unit for determining an azimuthal orientation 31 of the apparatus, with the azimuthal orientation corresponding in particular to a yaw angle of the apparatus, and an image processing and evaluation unit, which is formed in such a way that with the aid of knowledge of both a fixed position relationship of the camera 5 relative to the target and of the defined imaging direction of the camera 5, and as a function of the currently determined target position, the currently determined pitch and roll angles 35, 36 and the currently determined azimuthal orientation 31 for one or more target points 20 to be defined or surveyed, which lie in the field of view of the camera 5 and the spatial coordinates of which are known, a position in the camera image is derived and a marking 20' for the one or more target points 20 is displayed on the display 9 in accordance with the position in the camera image, overlaid thereon.

For indexing of the ground position 13—corresponding to the current target position—(which, as described above, when using a survey stick is usually carried out by the lower tip of the stick) in this exemplary embodiment a laser pointer 23 automatically (in particular suspended self-centered or as a pendulum) pointing vertically downward may be provided, which projects a visible laser spot 13, corresponding to the current target position, onto the ground with the aid of the laser beam 23'. Therefore, the laser pointer 23 may in particular thus be used as a survey stick replacement and is also acquired by the camera as a bright point on the ground, and can be seen in the camera image as a spot 13'.

Figure 10:
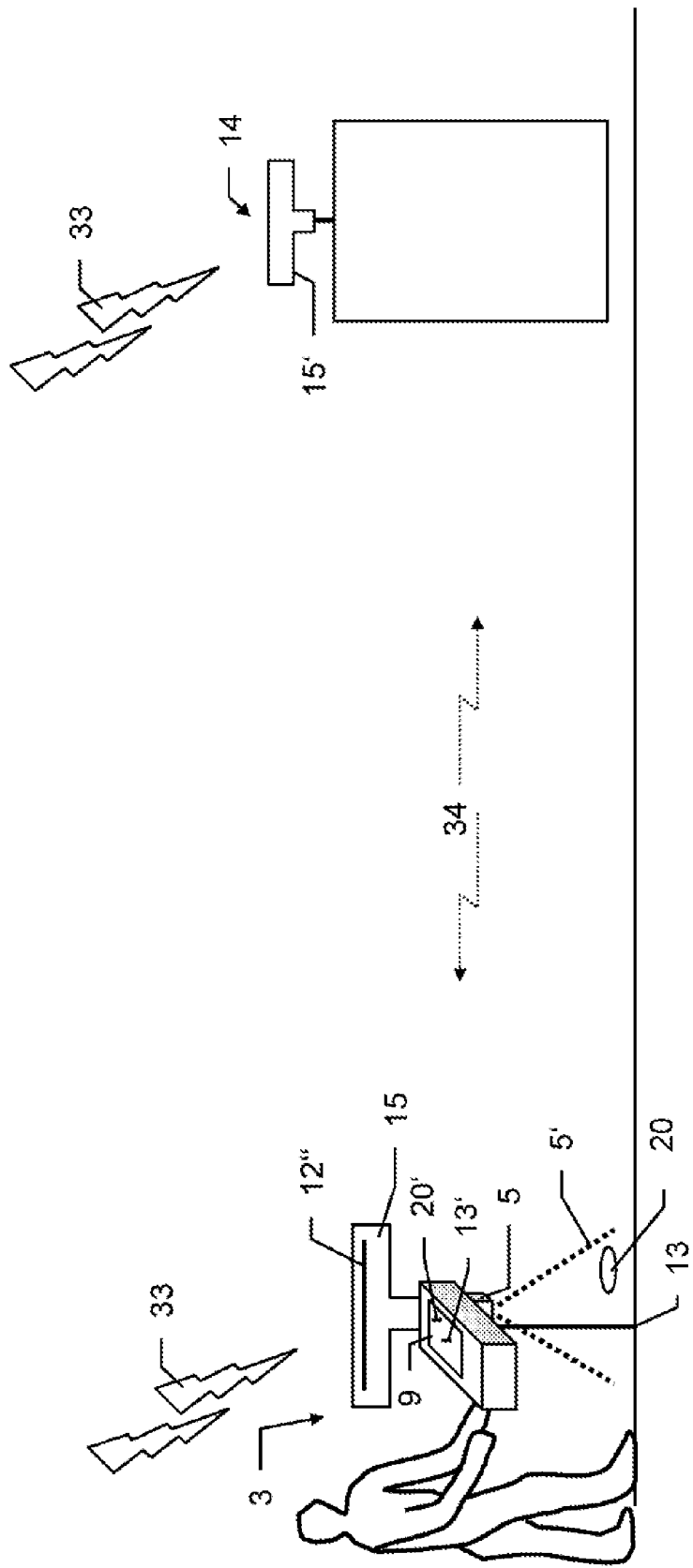
FIG. 10 shows a possible application of the mobile target unit shown in FIG. 9 in the field.

In order to define the target point 20, the user can now—as can be seen in the application represented in FIG. 10—straightforwardly move and advance the mobile target unit in such a way that the marking 20' comes to coincide with the laser spot 13' projected onto the ground and visible in the camera image. Precisely the desired target point is then finally indicated by the laser spot on the ground in this end position and can be defined.

If the laser pointer is in this case also formed as an EDM module (EDM=electronic distance measurement)—i.e. equipped with electronic distance measurement functionality—(to which end, for example, a suitable receiver for radiation reflected by the ground may be provided), the current height 18 of the mobile apparatus above the ground can also be determined. This height 18 of the apparatus above the ground, determined in this way, corresponds in the exemplary embodiments shown in the previous figures to the known length of the survey stick, with the aid of which a value of the height of the target above the ground can be derived in the previous examples.

The—in particular azimuthal—orientation of the apparatus, or of the associated camera 5, indicated by the arrow 31, may for example be determined with a compass, in particular an electronic compass, which is for example integrated in the apparatus.

As an alternative, the azimuthal orientation of the apparatus, or of the associated camera, may also be determined with the aid of inertial sensors (which may also make it possible to determine relative pitch and roll angles of the apparatus), in particular rotation rate sensors (gyroscopes) and/or acceleration sensors. In particular, the sensors may in this case also be integrated in a compact inertial measurement unit "IMU".

The azimuthal orientation may, however, also be determined without additional inclination or rotation rate measuring sensors. For example, the azimuthal orientation may be determined with the aid of a combination of the data relating to the distance travelled with the target unit (movement history of the target) with data derived from a sequence of camera images acquired by the handheld apparatus from the ground surface travelled over during the advance (e.g. data relating to the direction in which the recorded surface moves during the progress of the target unit through the camera image).

To this end, the time-variant surface information in the camera image sequence is tracked and the movement direction of the camera relative to the ground surface is determined with the aid of the relative changes (for example detected movements of identified features) of the ground in successively taken recordings of the image sequence.

In order to record the camera image sequence, the camera may repeatedly acquire the surface of the ground. The repeated acquisition is in this case carried out particularly at short time intervals, for example at a rate of every 10 ms-100 ms. By the evaluation component, with the aid of image recognition, surface features displaced from camera image to camera image in the image sequence due to the progress of the camera are then tracked. In this case, a displacement and/or rotation of an identified feature in two successive recordings represents the movement of the camera which has taken place relative to the ground. This movement is also carried out by the apparatus, since the camera is fitted directly to the apparatus. The movement direction of the handheld apparatus is thus determined and monitored continuously.

Consequently, the evaluation component can thus determine the movement direction of the apparatus relative to the ground from the image information of the camera.

In order to improve the identification and allocation of surface features of the ground in the individual recordings, and thereby determine the movement direction relative to the ground more precisely, illumination or brightening of the ground surface to be acquired is possible. This illumination may be carried out in various ways, for example with radiation in a special spectral range or with a beam pattern projected onto the ground structure to be acquired (for example with the aid of the laser pointer 23). Likewise, the ground may also be analyzed with respect to its emission characteristic for the reflected radiation, for example with respect to the colors of the ground surface, and this information may additionally be used in order to determine movement/rotation of identified features in a sequence of acquired camera images.

In summary, for the determination of a relative azimuthal orientation (or an orientation change) of the apparatus relative to the ground, the camera is formed for continuous acquisition of the ground surface, in particular with a repetition rate of between 10 Hz and 100 Hz, the target unit being moved forward between recordings thereby generated of the ground surface, and the evaluation component being formed to identify a movement of an identified structural feature of the recorded ground surface by comparison of the recordings, and the relative movement direction, or azimuthal orientation changes of the camera relative to the ground, being determined therefrom.

For example, the evaluation component may furthermore also determine the relative movement speed and the distance travelled by the camera, or the mobile target unit, relative to the ground from the information of the camera image sequence, and store information regarding the movement direction and/or the movement speed and/or the distance travelled.

If this azimuthal relative orientation (or orientation change), determined in this way, of the mobile target unit relative to the ground also jointly takes into account the distance travelled by the mobile target unit during the recording of the camera image sequence—determined with the aid of the GNSS module in the defined (absolute) coordinate system—then the absolute azimuthal orientation of the target unit (also in the coordinate system of the GNSS) can be deduced.

In other words, by combining the information determined relatively and absolutely (i.e. the determined relative orientation changes of the target unit with the distance thereby travelled determined with the aid of the GNSS), the absolute azimuthal orientation of the target unit can be deduced in the defined (external) coordinate system.

Once this absolute azimuthal orientation of the target unit has been determined and is known, then it is subsequently sufficient to determine the relative orientation thereafter theoretically from the camera image sequence, in order to continue to maintain knowledge of the absolute azimuthal orientation continuously.

However, since errors will accumulate in this case, a check and/or recalculation of the absolute orientation, in particular again by combining the information acquired relatively (camera image sequence) and absolutely (GNSS), as described above, at particular time intervals or after particular events (for example every 1 to 20 seconds or after particularly jerky movements of the mobile target unit have taken place, which may for example also be identified by using the camera image sequence).

Apart from the use according to the invention of the absolute azimuthal orientation determined in this way for the target unit (i.e. for determining a corresponding camera image position of the target point which is sought/to be defined in the camera image and for inserting a marking for the target point to be defined in the camera image), according to a further inventive aspect the absolute azimuthal orientation determined in this way for the mobile target unit may also be used for guidance of the user to points to be defined, including before the mobile target point which is sought/to be defined is yet in the field of view of the camera. For example, an arrow pointing in the direction of the definition point, the direction of which is adapted as a function of the current azimuthal orientation of the target apparatus, may then be displayed in the display of the apparatus in order to guide the user, or corresponding direction-indicating speech outputs may take place—as a function of the current azimuthal orientation of the target apparatus.

This type of guidance is in principle already known from the prior art. Yet since the current azimuthal orientation has to date merely been calculated from the last distance travelled by the mobile target unit (with the assumption that the apparatus is not moved out of line)—i.e. from the movement history—pure azimuthal orientation changes which take place essentially without further advance of the target unit cannot be taken into account. This then often leads to abruptly changing guidance indications (for example an abruptly rotating direction arrow in the display) and therefore to misguiding of the user in the scope of the guidance function. Furthermore, even in the case of very slow advance, the current azimuthal orientation may be determined only very unreliably (since advance of the handheld target unit out of line then often takes place), which can also lead to corresponding misguiding of the user in the scope of the guidance function.

By jointly including and using the relative movement direction and relative orientation changes of the handheld target unit relative to the ground, which can be determined currently and with a high rate according to the invention from the camera image sequence, this disadvantage can be significantly reduced and the absolute azimuthal orientation used for the guidance function can be determined significantly more reliably. The camera facing downward (i.e. at the ground travelled over) of the mobile target unit in this case fulfills a similar function to an optical computer mouse.

Figure 11:
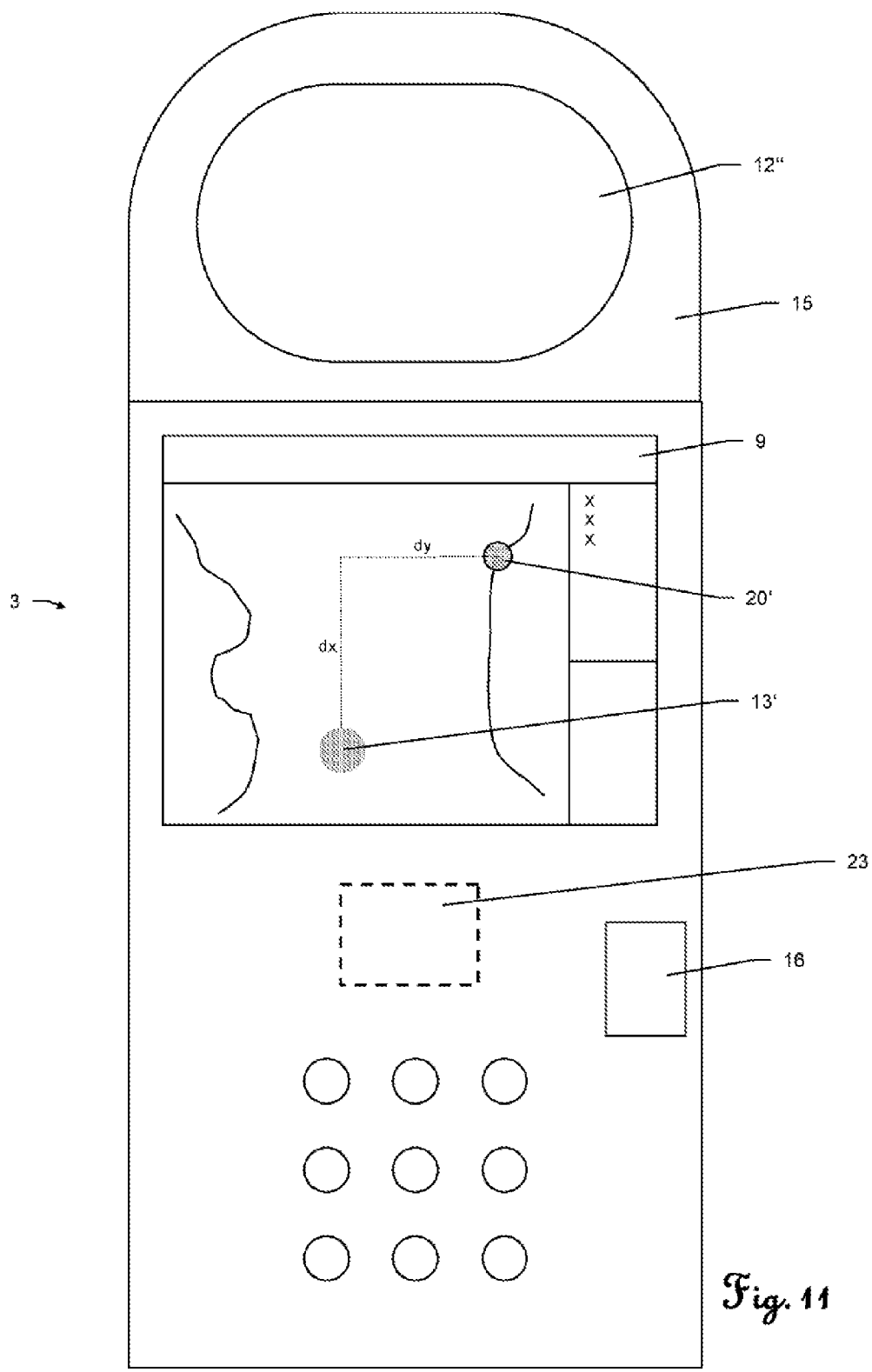
FIG. 11 shows a plan view of the mobile target unit shown in FIG. 9.

As shown in FIG. 11, for highly precise determination (i.e. carried out with geodetic accuracy) of the GNSS position of the target (i.e. the GNSS antenna and therefore also the mobile target unit), it is possible in turn to use GNSS correction data which may be derived and generated by a reference station and then transmitted, for example by radio, and received by the mobile target unit.

The handholdable apparatus 3 integrating the components of the target unit may in this case furthermore be formed with remote control functionality for the reference station (for example a total station with an attached GNSS module) and therefore also as a remote control unit/data logger for a total station.

FIG. 11 shows a plan view of the mobile target unit, comprising a GNSS module 15, according to the invention and already described in connection with FIG. 10, all the components of the mobile target unit being integrated in a handholdable apparatus 3. A GNSS antenna 12" is in this case once more integrated in the GNSS module 15.

Also provided are an electronic graphical display 9, a camera located on the lower side, a sensor 16 for determining a pitch angle and a roll angle of the apparatus, and a laser pointer 23 automatically (in particular suspended self-centered or as a pendulum) pointing vertically downward.

Figure 12:
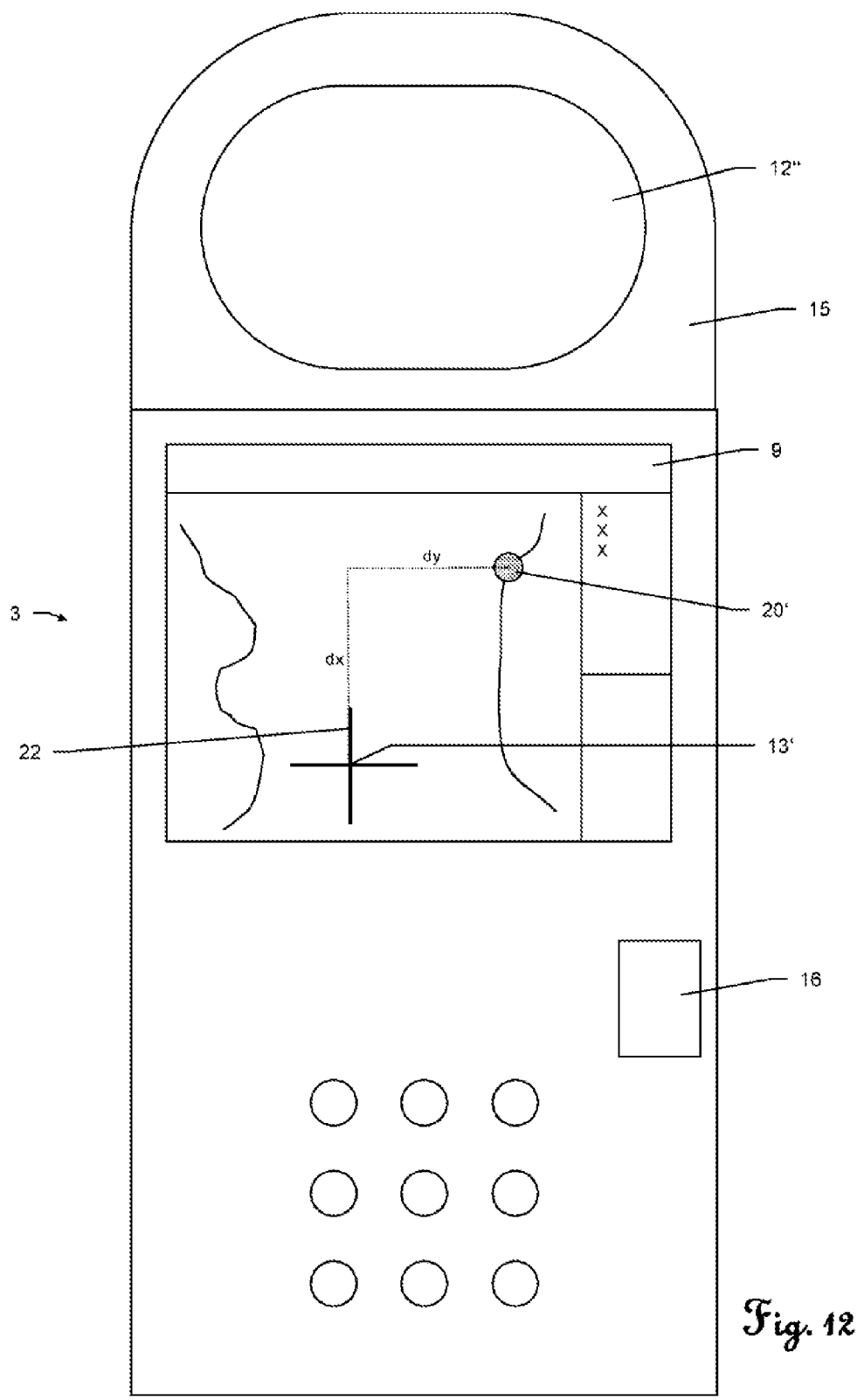
FIG. 12 shows a plan view of another alternative embodiment of the mobile target unit shown in FIGS. 9 and 11.

According to the invention—as can be seen in the display 9 represented in FIG. 12—by the image processing and evaluation unit,
   with the aid of knowledge of a fixed position relationship of the camera 5 with respect to the target (i.e. GNSS antenna 12") as well as of the defined imaging direction of the camera
   and
   as a function of the currently determined target position, the currently determined pitch and roll angles and the currently determined azimuthal orientation
   for one or more target points to be defined or surveyed, which lie in the field of view of the camera and the spatial coordinates of which are known, a position in the camera image is derived and a marking 20' for the one or more target points is generated in accordance with the position in the camera image and displayed on the display 9, overlaid on the camera image.

The indexing of the ground position—corresponding to the current GNSS antenna position—is carried out by the laser pointer 23, which to this end emits a laser beam directed automatically vertically downward and thereby projects a laser spot onto the ground. This laser spot projected onto the ground is also acquired by the camera and can be seen as such 13' in the camera image represented on the display 9.

In order to define the target point, the user can now—as can be seen in the application represented in FIG. 10—straightforwardly move and advance the mobile target unit in such a way that the target point marking 20' overlaid on the camera image in accordance with the sought target point position comes to coincide with the laser spot 13' projected onto the ground and visible in the camera image.

As an alternative to the indexing shown in FIGS. 9 to 11 of the ground position—corresponding to the current GNSS antenna position—by a laser pointer, as shown in FIG. 12 a marking such as a crosshair 22 may also be inserted at the ground position 13'—corresponding to the current GNSS antenna position—overlaid on the camera image.

Advantageously, for the corresponding insertion of the crosshair 22 at the ground position 13' which is given by a perpendicular projection of the GNSS antenna position onto the ground, the current pitch and roll angles of the apparatus 3 which are determined by the sensor 16 are in this case also taken into account.

If the apparatus is held slightly inclined and the ground point lying vertically below the GNSS antenna is therefore imaged rather at the lower edge in the camera image, then the crosshair will also be inserted at the lower edge in accordance with the indication of this ground point in the camera image corresponding to the current GNSS antenna position, and correspondingly overlaid on the camera image indicated in the display 9.

Depending on the current pitch and roll angles of the apparatus 3 (i.e. depending on how the user is currently holding the apparatus in his hands) the position of the crosshair 22 in the camera image may then be adapted and tracked "live" and continuously in such a way that the crosshair always indexes the ground point 13' which lies vertically directly below the GNSS antenna (or another defined reference point of the apparatus).

In order once more to define the target point, in a straightforward way, the user may then—similarly as in the case of real generation of a laser spot on the ground indexing the ground point 13', according to the embodiment of FIGS. 9 to 11—move and advance the mobile target unit in such a way that the target point marking 20' superimposed on the camera image in accordance with the sought target point position lies at the center of the inserted crosshair 22.

After this end position is reached, the user is then holding the apparatus 3 exactly vertically over the sought target point to be defined.

It is to be understood that these figures which have been described merely schematically represent possible exemplary embodiments. The various approaches may likewise be combined with one another as well as with methods of the prior art.

What is claimed is:

1. A survey system comprising:
a position determination unit for determining a target position in a defined coordinate system, and
a mobile target unit for staking out and/or position determination of target points in the coordinate system, wherein the mobile target unit includes:
a surveying pole, the lower end of which is configured to be brought into target point contact,
a target which is configured to be fitted on the surveying pole and the target position of which is determinable with high precision;
a handholdable remote control unit for the survey system, wherein the remote control unit includes an electronic graphical display and is attachable to a holder on the surveying pole and is—in the attached state—furthermore in a fixed position relationship with respect to the target fitted on the surveying pole;
the remote control unit comprises a camera for recording a camera image in a defined imaging direction; and
an image processing and evaluation unit having a data link to the position determination unit and the camera is provided, by which, with the aid of knowledge of the fixed position relationship and the defined imaging direction, and as a function of the target position determined, image data of the camera are brought into spatial relation with the target points in the coordinate system.

2. The survey system as claimed in claim 1, wherein the position determination unit is a total station or a GNSS module.

3. The survey system as claimed in claim 1, wherein the target is formed as a survey reflector which is configured to be surveyed with the aid of a total station or as a GNSS antenna having a data link to the GNSS module of the position determination unit.

4. The survey system as claimed in claim 1, wherein the camera, the display, the position determination unit and the image processing and evaluation unit interact and are configured—as a function of the currently determined target position for one or more target points to be staked out or surveyed, which lie in the field of view of the camera and the spatial coordinates of which are known,—to derive a target point position in the camera image and to display a marking for the one or more target points on the display in accordance with the target point position in the camera image, overlaid thereon.

5. The survey system as claimed in claim 1, wherein in order to derive the target point positions in the camera image, a digital terrain model is used and jointly taken into account.

6. The survey system as claimed in claim 1, wherein in order to derive the target point positions in the camera image, a digital terrain model is used and jointly taken into account, wherein a sensor for recording a digital terrain model of the terrain lying in the field of view of the camera is provided.

7. The survey system as claimed in claim 6, wherein the sensor for recording a digital terrain model includes an RIM sensor or a stereophotogrammetry module.

8. The survey system as claimed in claim 1, wherein the camera, the display, the position determination unit and the image processing and evaluation unit interact and are configured:
to display a film sequence acquired by the camera is displayed live on the display, and
to mark—overlaid on the displayed film sequence and as a function of the currently determined target position—one or more target points, which are to be staked out or surveyed and the spatial coordinates of which are known, in the camera image and to display them on the display.

9. The survey system as claimed in claim 1, wherein the camera and the display are arranged and oriented on the remote control unit to allow an operator to view a terrain surface by means of the camera, wherein either:
the surface normal of the display is oriented parallel to the imaging direction of the camera; or
the surface normal of the display is inclined by an angle of between 10 and 45 degrees.

10. The survey system as claimed in claim 1, wherein the camera and the display are arranged and oriented on the remote control unit to allow an operator to view a terrain surface by means of the camera, wherein either:
the surface normal of the display is oriented parallel to the imaging direction of the camera, wherein the optical axes of the display and of the camera are oriented coaxially but the viewing directions mutually opposite; or the surface normal of the display is inclined by an angle of 30° with respect to the imaging direction of the camera, and wherein the camera is oriented—when the remote control unit is attached to the surveying pole—to have the lower end of the surveying pole lying in the field of view of the camera.

11. The survey system as claimed in claim 1, wherein when the remote control unit is attached to the surveying pole the structure of the surveying pole the fixed position relationship of the remote control unit relative to the fitted target is ensured, and wherein the fixed position relationship is made available to the image processing and evaluation unit with the aid of at least one of the following means:

storage means, in which the fixed position relationship is stored;

position relationship determination means, which make a current distance from the remote control unit to the target and/or a current orientation including the azimuthal and/or elevational orientation of the remote control unit determinable, wherein the position relationship determination means comprise a distance sensor and/or a compass integrated in the remote control unit and/or an inclination sensor integrated in the remote control unit;

input means, configured to allow a user to enter data relating to the fixed position relationship; and a data set stored electronically or graphically on the holder, which comprises information relating to the fixed position relationship ensured by the surveying pole, and a readout means provided in the remote control unit and configured to read out the data set.

12. A mobile target unit, comprising:

a surveying pole, the lower end of which is configured to be brought into target point contact;

a target which is configured to be fitted on the surveying pole and the target position of which is determinable with high precision, wherein the target is formed as a survey reflector which is configured to be surveyed with the aid of a total station or as a GNSS antenna having a data link to the GNSS module of the position determination unit;

a handholdable remote control unit for the survey system, wherein the remote control unit comprises an electronic graphical display and is attachable to a holder on the surveying pole and—when in the attached state—to be in a fixed position relationship with respect to the target fitted on the surveying pole;

the remote control unit comprises a camera for recording a camera image in a defined imaging direction; and an image processing and evaluation unit having a data link to the position determination unit and the camera is provided, by which, with the aid of knowledge of the fixed position relationship and the defined imaging direction, and as a function of the target position determined, image data of the camera are brought into spatial relation with the target points in the coordinate system.

13. The mobile target unit as claimed in claim 12, wherein the camera and the display are arranged and oriented on the remote control unit to allow an operator to view a terrain surface by means of the camera, wherein the surface normal of the display is oriented parallel to the imaging direction of the camera, wherein the optical axes of the display and of the camera are oriented coaxially but the viewing directions mutually opposite.

14. The mobile target unit as claimed in claim 12, wherein the camera is oriented—when the remote control unit is attached to the surveying pole—to have the lower end of the surveying pole lying in the field of view of the camera.

15. The mobile target unit as claimed in claim 12, wherein when the remote control unit is attached to the surveying pole owing to the structure of the surveying pole the fixed position relationship of the remote control unit relative to the fitted target is ensured.

16. The mobile target unit as claimed in claim 15, wherein the fixed position relationship is made available to the image processing and evaluation unit with the aid of at least one of the following means:

storage means, in which the fixed position relationship is stored;

position relationship determination means, which make a current distance from the remote control unit to the target and/or the azimuthal and/or elevational orientation, of the remote control unit determinable;

input means, configured to allow a user to enter data relating to the fixed position relationship, a data set stored electronically or graphically on the surveying pole which comprises information relating to the fixed position relationship ensured by the surveying pole, and a readout means provided in the remote control unit and configured to read out the data set.

17. The mobile target unit as claimed in claim 15, wherein the fixed position relationship is made available to the image processing and evaluation unit with the aid of at least one of the following means:

storage means, in which the fixed position relationship is stored, position relationship determination means, which make a current distance from the remote control unit to the target and/or azimuthal and/or elevational orientation, of the remote control unit determinable, wherein the position relationship determination means comprise a distance sensor and/or a compass integrated in the remote control unit and/or an inclination sensor integrated in the remote control unit;

input means, configured to allow a user to enter data relating to the fixed position relationship; and a data set stored electronically or graphically on the holder which comprises information relating to the fixed position relationship ensured by the surveying pole, and a readout means provided in the remote control unit and configured to read out the data set.

18. A handholdable remote control unit for a mobile target unit as claimed in claim 15, wherein the remote control unit comprises an electronic graphical display and is attachable to a holder on the surveying pole of the mobile target unit and—when in the attached state—to be in a fixed position relationship with respect to the target fitted on the surveying pole, wherein:

the remote control unit comprises a camera for recording a camera image in a defined imaging direction, and an image processing and evaluation unit having a data link to the position determination unit and the camera is provided, by which with the aid of knowledge of the fixed position relationship and the defined imaging direction, and as a function of the target position determined image data of the camera are brought into spatial relation with the target points in the coordinate system.

19. The handholdable remote control unit as claimed in claim 18, wherein the camera and the display are arranged and oriented on the remote control unit to allow an operator to view a terrain surface by means of the camera, wherein the surface normal of the display is oriented parallel to the imaging direction of the camera, in particular wherein the optical axes of the display and of the camera are oriented coaxially but the viewing directions mutually opposite.

20. The handholdable remote control unit as claimed in claim 18, wherein the camera is oriented in such a way that when the remote control unit is attached to the surveying pole the lower end of the surveying pole lies in the field of view of the camera.

21. A method for defining and/or determining a position of a target point using a survey system as claimed in 1, having the following steps:
   attaching a handholdable remote control unit, having a camera fitted thereon, to a surveying pole, the lower end of which is configured to be brought into target point contact, wherein the remote control unit is attached in a fixed position relationship with respect to a target fitted on the surveying pole;
   establishing or ensuring a data interchange link between the mobile target unit;
   arranging the camera in the direction of a terrain surface, in which target points are to be staked out or surveyed, and recording images and displaying them on a display of the remote control unit continuously or at defined time intervals,
   inserting a direction indicator into the image of the camera in the display;
   guiding the target unit until a match of the image with the marking for the intended position of the target point is achieved;
   defining or determining the position of the target point.

22. A method for defining and/or determining a position of a target point using a survey system as claimed in 1, having the following steps:
   attaching a handholdable remote control unit, having a camera fitted thereon, to a surveying pole, the lower end of which is configured to be brought into target point contact, wherein the remote control unit is attached in a fixed position relationship with respect to a target fitted on the surveying pole;
   establishing or ensuring a data interchange link between the mobile target unit, in particular the remote control unit, and the position determination unit;
   arranging the camera in the direction of a terrain surface, in which target points are to be staked out or surveyed, and recording images and displaying them on a display of the remote control unit continuously or at defined time intervals;
   inserting a direction indicator by means of an arrow, and/or indicators of distance to an intended target point and/or a marking for the intended position of a target point, into the image of the camera in the display;
   guiding the target unit until a match of the image with the marking for the intended position of the target point is achieved;
   defining or determining the position of the target point; and
   recording in real time and storing an image of the defined or position-determined target point by means of the camera.

23. A survey system comprising:
a mobile target unit integrated in a compact handholdable apparatus for staking out and/or position determination of target points in a defined coordinate system, wherein the target unit includes:
   a GNSS module formed as a position determination unit, having an integrated GNSS antenna formed as a target, for determining the target position in the coordinate system;
   an electronic graphical display;
   a camera for recording a camera image in a defined imaging direction directed approximately vertically downward in the working position of the handholdable apparatus;
   a biaxial inclinometer for determining a pitch angle and a roll angle of the apparatus;
   an orientation determination unit for determining an azimuthal orientation of the apparatus, wherein the azimuthal orientation corresponds in particular to a yaw angle of the apparatus; and
   an image processing and evaluation unit, which is formed in such a way that:
      with the aid of knowledge of both a fixed position relationship of the camera relative to the target and of the defined imaging direction of the camera; and
      as a function of the currently determined target position, the currently determined pitch and roll angles and the currently determined azimuthal orientation, for one or more target points to be staked out or surveyed, which lie in the field of view of the camera and the spatial coordinates of which are known, a position in the camera image is derived and a marking for the one or more target points is displayed on the display in accordance with the position in the camera image, overlaid thereon.

* * * * *